Oct. 17, 1950     J. HOËPPE     2,526,025

HOLE-DRIFTING AND TUBE-EXPANDING TOOL

Filed Feb. 1, 1949

Patented Oct. 17, 1950

2,526,025

UNITED STATES PATENT OFFICE 2,526,025

HOLE-DRIFTING AND TUBE-EXPANDING TOOL

Julien Hoëppe, Paris, France, assignor to L'Outillage Rotax, Paris, France, a French company Application February 1, 1949, Serial No. 73,915
In France April 22, 1948

1 Claim. (Cl. 153—82)

The present invention relates to a machine designed to expand tubes in tube plates or like supports, for instance in the dudgeoning of the tubes in boilers, condensers, heat-exchangers or like apparatus and more generally in the performance of whatever work that concerns the fixing of tubes by expanding (e. g. the dudgeoning of the outlet manifold on the heads of an internal combustion engine). This machine makes it possible in one single operation to drift a hole to the desired diameter and at the same time to countersink the said hole at one of its ends. Thus, the said machine is capable of drifting a hole punched in a plate to a predetermined diameter and at the same time to form a chamfer on the one end of said hole. The said machine is also capable of enlarging the diameter of a tube so that it shall exactly conform the walls of a hole provided in a plate and at the same time to flange the end edge of the tube into engagement with the countersunk edge of the hole. All these operations can be performed by means of one and the same machine, only the head of which has to be replaced.

With this end in view the machine according to the invention is characterized thereby that a rotary tubular head, comprising a cylindrical portion that can be engaged into the hole to be drifted and a swelled portion, is provided in its cylindrical portion with longitudinal slots in which rolls are received the axes of which are substantially parallel with the axis of the tubular head and in its swelled portion with recesses adapted to receive rollers the axes of which are inclined with respect to the axis of the tubular head and the peripheral surface of which is adapted to engage one of the edges of the hole, while a tapered pin projecting axially through the tubular head can be moved forwards and rotated about its axis so that the cylindrical axially directed rolls will thereby be cammed progressively outwards with the result that the metal around the hole will be swaged and the diameter of the hole increased in proportion, while the terminal edge of the hole is countersunk by said inclined rollers.

The said head is secured removably on a rotary barrel that finds a rest through the medium of a ball thrust bearing on the perforated plate in which the tubes are to be expanded.

The head may be so dimensioned that its cylindrical portion can be accommodated in the holes in the plate in which the tubes are to be dudgeoned in order that the set of axially directed rolls shall drift the holes to the desired diameter while the set of inclined rollers shall countersink one end of said holes.

The head may also be so dimensioned that its cylindrical portion can be received in the tubes so that the set of axially directed rolls shall expand the walls thereof into fluid tight engagement with the walls of the holes, while the set of inclined rollers shall flange the edges of the tubes into fluid-tight engagement with the countersunk end of the holes.

Provided the heads to be coupled with the barrel are similarly shaped and dimensioned just a few of them are necessary to deal with the whole range of standard size tubes.

Further features of the invention will be pointed out in the following description of an expanding tool according to the invention.

A particular embodiment of the said tool is illustrated by way of example in the appended drawing.

The tube expander according to the invention comprises a barrel 1 which is mounted for free rotation and which can find a rest through the medium of a ball thrust bearing 2 and a foot member 3 on the plate P in which tubes are to be dudgeoned. An internally threaded recess 4 provided in the barrel 1 is adapted to receive a tubular head equipped with the members intended to act directly upon the metal of the tubes to be expanded and upon the metal of the holes provided in the plate P.

Figure 1:
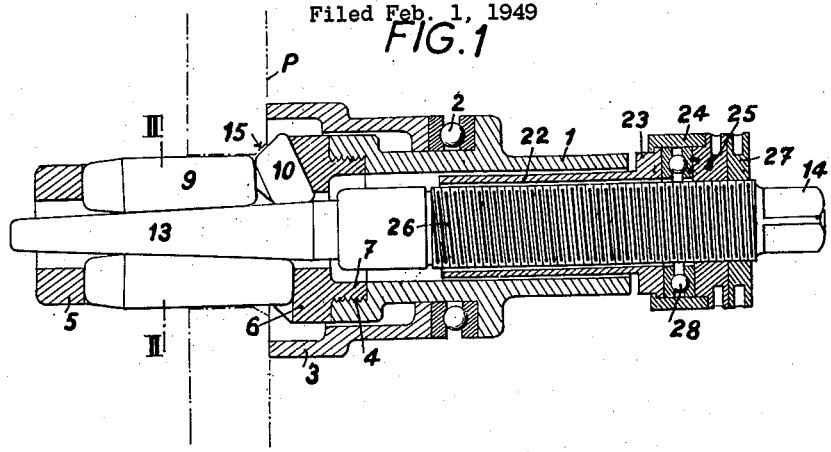
Figure 1 is a longitudinal section taken on line I—I in Fig. 2, the tubular head being designed for the drifting and countersinking of holes provided in plates or like supports.
Figure 2:
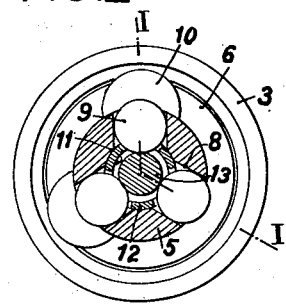
Figure 2 is a sectional view taken on line II—II in Fig. 1.

The tubular head designed to drift the perforations in the plate P and to countersink one end thereof, as shown in Figs. 1 and 2, comprises a cylindrical portion 5 which is smaller in diameter than the holes in plate P so that it can be inserted thereinto. The head moreover comprises a swelled portion 6 having a threaded end 7 to be screwed into the threaded recess 4 in the barrel 1.

Provided in the cylindrical portion 5 are longitudinal slots for the accommodation of rolls 9, the axes of which are substantially parallel with the axis of the tubular head.

Figure 5:
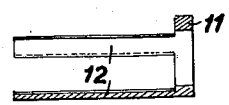
Figure 5 shows a bush designed to keep the rolls and rollers within the tubular head.

The swelled portion 6 is provided in that end thereof which is next to the cylindrical portion 5 with recesses in which are freely rotatable rollers 10 the axes of which are directed at an angle to the axis of the tubular head and the peripheral surfaces of which are intended to engage the edges of the perforation in the plate P. Advantageously, the said rollers 10 are conical in shape. A cylindrical bush 11 (see Figs. 2 and 5) is inserted in the central aperture in the head and is provided with projections 12 located between the rolls 9 and rollers 10 to keep the same in position within the tubular head.

A pin that extends axially through the barrel 1 and the tubular head 5 terminates at one end thereof in a taper portion 13 cooperating with the rolls 9 and at the opposite end in a square or hexagonal or like shank 14 by means of which the pin is rotated and moved towards the tubular head with the aid of any suitable device conventionally used in tube expanding tools.

As the pin 13 is moved outwards the rolls 9 which preferably are slightly tapered contrawise to the taper of pin 13 are cammed outwards by the latter with respect to the cylindrical portion 5 of the tubular head, whereby the metal about the hole in the plate P is swaged until the desired diameter is obtained. Meanwhile, the rollers 10 act upon the edge 15 of the hole and countersink the same. It will be remarked that in this manner the drifting and countersinking of the holes in plate P are performed in one single operation.

Figure 3:
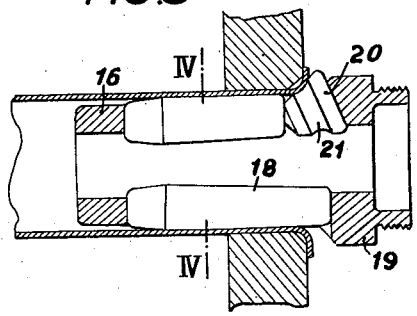
Figure 3 is a longitudinal section taken on line III—III in Fig. 4 and shows a tubular head designed for expanding the tubes and flanging one end thereof into engagement with the plate in which they are to be dudgeoned.
Figure 4:
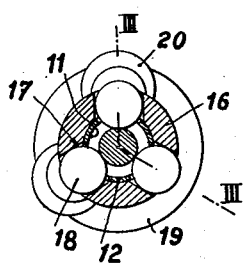
Figure 4 is a sectional view taken on line IV—IV in Fig. 3.

The head 5—6 just described can be exchanged on the barrel 1 for a similar head designed to expand the tubes inserted into the holes in plate P and to flange the ends of said tubes. As shown in Figs. 3 and 4 the said head likewise comprises a cylindrical portion 16 provided with slots 17 in which rolls 18 are received and a swelled portion 19 provided with recesses in which are rotatably received rollers 20 of generally conical shape having their axes set at an angle to the axis of the tubular head. A bush similar to the bush 11 described in connection with the head shown in Figs. 1 and 2 keeps the rolls 18 and rollers 20 in position. In this case the cylindrical portion 16 is diametrically so dimensioned that it can enter the tube to be expanded. As the pin 13 is moved outwards (see Fig. 1) the rolls 18 which are cammed thereby towards the outside will expand the tube into engagement with the walls of the hole in plate P, while annular grooves 21 provided on the rollers 20 will press the end of the tube and flange it into engagement with the plate P around the hole. Again, it will be noted that the tube is expanded and flanged in one single operation.

The taper pin 13 should not be moved forward more than is necessary either to drift the hole in plate P to the desired diameter or to swage it into engagement with the wall of the hole. It will be appreciated that owing to the taper of the portion 13 of the pin, the rolls 9 or 18 would be driven apart too much in the case of an excessive displacement of the pin, which might result in the formation of cracks in the hole walls or in an excessive thinning of the tube. In order to prevent this inconvenience a stop rigid with the end of the pin 13 cooperates with the end of the barrel 1 to limit the displacement of the pin. In the example illustrated in Fig. 1 the said stop consists of a sleeve 22 ending in a flange 23 retained in a sleeve 24 received in a nut 25 screwed on the threaded portion 26 of the pin. A lock nut 27 locks the whole in the position given thereto. The sleeve 22 protects the threads on the pin and a thrust bearing 28 enables the sleeve 22—23 to rotate with respect to the pin and to the nuts 25 and 27. In order to limit the displacement of the pin the nut 25 is screwed on the threaded portion 26 in such a manner that a space is left between the stop 23 and the adjacent end of the barrel 1 the size of which is determined by the desired expansion of the hole in the plate or of the tube to be dudgeoned. The whole is locked in the position set by means of the lock nut 27. Upon the pin being moved forwards the stop 23 will be caught by the barrel 1 and the taper pin 13 will thus be prevented from moving further on into the tubular head.

Figure 6:
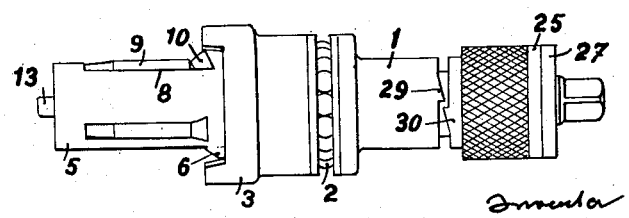
Figure 6 illustrates a modification.

In a modification, instead of the stop being designed as shown in Fig. 1, it may be constituted as illustrated in Fig. 6. In this modification the parts 22, 23, 24 and 28 of Fig. 1 are dispensed with and only the nuts 25 and 27 are retained. In this case however the barrel 1 and the nut 25 are formed on their opposite faces with claws 29 and 30 which engage each other as the stroke of the pin 13 is completed. The barrel 1 is thus made peripherally rigid with the nuts and the pin, and since the barrel and the nuts are held by the plate in which the expanding work is performed, the effect of the rotation of the pin is to loose the latter from the nuts and to pull the pin 13 out of the tubular head.

The tool according to the invention may be used to dudgeon tubes of rather different diameters. When tubes have to be dudgeoned which are different in diameter from the ones precedingly worked on it will only be necessary to remove the tubular head and to replace it by a new one. A six head set is sufficient to deal with the whole range of tubes commonly used. The threaded ends 7 of the heads are all of the same size, so that all of them can be secured to one and the same barrel 1.

Of course, the invention is not limited to either the embodiment or the structural details described hereinbefore and modifications may be made therein without departing from the scope of the invention.

What I claim as new is:

A machine for drifting and countersinking perforations in metallic members comprising a tubular support adapted to be maintained fixedly, a tubular barrel rotatably mounted in said support and provided with claws at one end, a tubular head coaxially and operatively connected with the other end of said barrel and having on the side remote from said barrel a cylindrical portion adapted to be introduced into the perforation to be drifted and provided with longitudinal slots, rolls adapted to be moved radially in said slots and to bear with their periphery on the walls of the perforation, a pin extending axially in said barrel and having at one end a conical portion adapted to cooperate with said rolls and at the other end a threaded portion followed by a driving portion adapted to be moved axially and to be rotated about the axis of said tubular head so as to force said rolls outwardly against the walls of the perforation, and a nut adapted to adjustably engage said threaded portion of said pin and provided with claws adapted to cooperate with the claws provided on said barrel so as to operatively connect said nut and said barrel when they are brought against each other, whereby further rotation of said pin causes said pin to unscrew and to be pulled out of said tubular head.

JULIEN HOËPPE.

REFERENCES CITED

The following references are of record in the file of this patent:

UNITED STATES PATENTS

| Number | Name | Date |
|---|---|---|
| 1,199,093 | Maupin | Sept. 26, 1916 |
| 1,323,036 | Faessler | Nov. 25, 1919 |
| 1,410,464 | Gallon | Mar. 21, 1922 |
| 1,514,099 | Pring | Nov. 4, 1924 |
| 1,680,922 | Wiedeke | Aug. 14, 1928 |
| 2,298,703 | Key | Oct. 13, 1942 |
| 2,383,214 | Prout | Aug. 21, 1945 |

FOREIGN PATENTS

| Number | Country | Date |
|---|---|---|
| 398,744 | Great Britain | Sept. 21, 1942 |
| 377,465 | France | July 11, 1907 |